US012646512B2

(12) United States Patent
Sundram et al.

(10) Patent No.: US 12,646,512 B2
(45) Date of Patent: Jun. 2, 2026

(54) DELIVERY OF COMPATIBLE SUPPLEMENTARY CONTENT VIA A DIGITAL ASSISTANT

(71) Applicant: Google LLC, Mountain View, CA (US)

(72) Inventors: Surath Sundram, Santa Clara, CA (US); Rupika Chatterjee, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 360 days.

(21) Appl. No.: 17/925,472

(22) PCT Filed: Oct. 21, 2020

(86) PCT No.: PCT/US2020/056638
§ 371 (c)(1),
(2) Date: Nov. 15, 2022

(87) PCT Pub. No.: WO2022/086519
PCT Pub. Date: Apr. 28, 2022

(65) Prior Publication Data
US 2023/0186911 A1 Jun. 15, 2023

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
CPC ... G10L 15/22; G10L 15/08; G10L 2015/088; G10L 2015/223; G06F 16/953; G06F 3/167; G06Q 30/0251
See application file for complete search history.

(56) References Cited

U.S. PATENT DOCUMENTS 6,792,086 B1    9/2004  Saylor et al.
2008/0189110 A1*  8/2008  Freeman ............ G06Q 30/0251
                                              704/251

(Continued)

FOREIGN PATENT DOCUMENTS

CN        106778507       5/2017

OTHER PUBLICATIONS

International Search Report and Written Opinion for PCT/US2020/056638, mailed on Jul. 20, 2021, 12 pages.

(Continued)

*Primary Examiner* — Linda Wong
(74) *Attorney, Agent, or Firm* — DORITY & MANNING P.A.

(57) ABSTRACT

Controlling delivery of supplementary content via digital assistants is provided. A system receives data packets from a computing device comprising voice input detected by a microphone of the computing device. The system processes the data packets to generate an action data structure. The system generates content selection criteria for input into a content selector component to select supplementary content. The system transmits a request to the content selector component to select supplementary content. The system receives a supplementary content item selected by the content selector component based on the content selection criteria generated by the digital assistant component. The system provides, in a first graphical user interface slot via a display device, the action data structure responsive to the voice input. The system provides, in a second graphical user interface slot via the display device, the supplementary content item.

22 Claims, 5 Drawing Sheets

(56) References Cited

U.S. PATENT DOCUMENTS

| 2009/0030800 | A1* | 1/2009 | Grois | .................... | G06Q 30/02 |
| | | | | | 707/999.005 |
| 2014/0229875 | A1* | 8/2014 | Li | .......................... | G09G 5/10 |
| | | | | | 715/771 |
| 2016/0078133 | A1 | 3/2016 | Santhanam et al. | | |
| 2018/0182398 | A1* | 6/2018 | Halstvedt | ................ | G10L 15/22 |
| 2020/0174746 | A1 | 6/2020 | Kothari et al. | | |
| 2021/0399568 | A1* | 12/2021 | Huang | ................ | G06F 3/04847 |

OTHER PUBLICATIONS

International Preliminary Report on Patentability for Application No. PCT/US2020/056638, mailed May 4, 2023, 10 pages.
Chinese Search Report Corresponding to Application No. 2020801026708 on Sep. 2, 2024.

* cited by examiner

400

DELIVERY OF COMPATIBLE SUPPLEMENTARY CONTENT VIA A DIGITAL ASSISTANT

PRIORITY CLAIM

This application is based upon and claims the right of priority under 35 U.S.C. § 371 to International Application No. PCT/US2020/056638 filed on Oct. 21, 2020, which is incorporated by reference herein.

BACKGROUND

Different computing devices may have different capabilities, such as different input or output interfaces or computational performance capabilities.

SUMMARY

This disclosure is generally directed to controlling delivery of supplementary content via a digital assistant. A digital assistant can be invoked responsive to a trigger word detected in a voice input. The digital assistant can process the voice input to generate output to be provided via a graphical user interface ("GUI") output via a display device. However, the GUI of the digital assistant may utilize only a portion of a display device, while a remaining portion of the display device remains empty or otherwise unused by the digital assistant. Leaving this remaining portion of the display device empty can result in wasted screen real estate. This technical solution can control delivery of supplementary content for provision via a portion of a display device that is not used by a GUI of a digital assistant that is invoked in response to voice input. This technical solution can select supplementary content that satisfies content parameters that is configured to reduce battery consumption of a mobile computing device, thereby allowing the digital assistant to reduce wasted or empty display space without excessive computing or energy resource utilization. The technical solution can pre-process or filter supplementary content item based on the content parameters in order to validate supplementary content for provision via a GUI slot established by the digital assistant.

At least one aspect is directed to a system to control delivery of supplementary content via digital assistants. The system can include data processing system comprising memory and one or more processors. The system can include a digital assistant component executed by the data processing system. The digital assistant component can receive, via a network, data packets from a computing device. The data packets can include voice input detected by a microphone of the computing device. The digital assistant component can process the data packets to generate an action data structure that is responsive to the voice input. The digital assistant component can generate content selection criteria for input into a content selector component to select supplementary content provided by a third-party content provider. The content selection criteria can include one or more keywords and a digital assistant content type. The digital assistant component can transmit a request to the content selector component to select supplementary content based on the content selection criteria. The digital assistant component can receive, responsive to the request, a supplementary content item selected by the content selector component based on the content selection criteria generated by the digital assistant component. The digital assistant component can provide, in a first graphical user interface slot via a display device coupled to the computing device, the action data structure responsive to the voice input. The digital assistant component can provide, for provision in a second graphical user interface slot via the display device coupled to the computing device, the supplementary content item selected by the content selector component.

At least one aspect is directed to a method of controlling delivery of supplementary content via digital assistants. The method can be performed by a data processing system comprising memory and one or more processors. The method can be performed by a digital assistant component executed by the data processing system. The method can include the data processing system receiving, via a network, data packets from a computing device. The data packets can include voice input detected by a microphone of the computing device. The method can include the data processing system processing the data packets to generate an action data structure that is responsive to the voice input. The method can include the data processing system generating content selection criteria for input into a content selector component to select supplementary content provided by a third-party content provider. The content selection criteria can include one or more keywords and a digital assistant content type. The method can include the data processing system transmitting a request to the content selector component to select supplementary content based on the content selection criteria. The method can include the data processing system receiving, responsive to the request, a supplementary content item selected by the content selector component based on the content selection criteria generated by the digital assistant component. The method can include the data processing system providing, in a first graphical user interface slot via a display device coupled to the computing device, the action data structure responsive to the voice input. The method can include the data processing system providing, for provision in a second graphical user interface slot via the display device coupled to the computing device, the supplementary content item selected by the content selector component.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
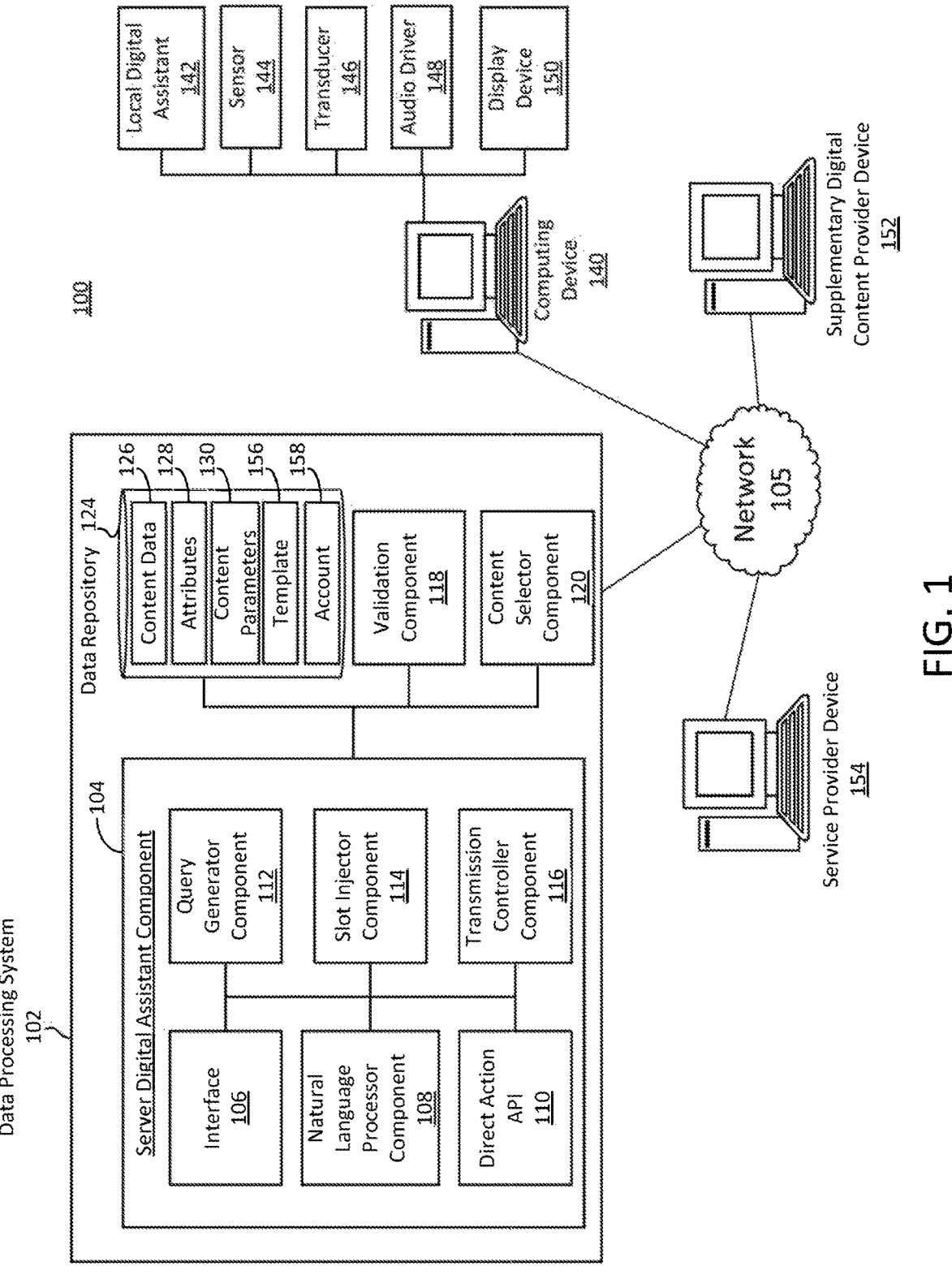
FIG. 1 is an illustration of an example system to control delivery of supplementary content via digital assistants, in accordance with an implementation.

Following below are more detailed descriptions of various concepts related to, and implementations of, methods, apparatuses, and systems of controlling delivery of supplementary content via a digital assistant. The various concepts introduced above and discussed in greater detail below may be implemented in any of numerous ways.

This technical solution is generally directed to controlling delivery of supplementary content via a digital assistant. Computing devices having a display device can provide one or more graphical user interfaces ("GUIs") via the display device. A computing device can provide a home screen or main GUI. When the computing device receives voice input, the computing device can process the voice input to detect a trigger keyword or hot word that is configured to invoke a digital assistant. Upon detecting the trigger word or hot word, the computing device can invoke the digital assistant to process the voice input and perform an action responsive to the voice input. The digital assistant can process the voice input to generate an output. The digital assistant can provide the output via a digital assistant GUI. However, this digital assistant GUI may not consume the entire home screen or footprint of the display device. That is, the digital assistant GUI may utilize only a portion of the display device, while a remaining portion of the display device or home screen may remain empty or otherwise unused by the digital assistants. Leaving this remaining portion of the home screen or display device may result in wasted screen real estate. Even though this portion of the display is not used the GUI of the digital assistant, the computing device may nonetheless consume battery resources or other resources to provide a portion of the home screen in this remaining space. Thus, this technical solution can control delivery of supplementary content for provision via a portion of a display device that is not used by a digital assistant GUI that is invoked in response to voice input. This technical solution can select supplementary content that satisfies content parameters that is established to reduce battery consumption of a mobile computing device, thereby allowing the digital assistant to reduce wasted or empty GUI space without excessive computing or energy resource utilization.

For example, a digital assistant can generate a GUI to display output responsive to voice input. The digital assistant GUI can be designed or constructed to be a compact GUI that does not utilize the entire portion of a display device that is available to provide GUI output. In such a configuration, the digital assistant may be underutilizing the available digital screen real estate. This technical solution can utilize the empty screen space resulting from the compact digital assistant GUI to provide supplementary content that is related to or enhances the output of the digital assistant.

In an illustrative example, the voice input can include a query "jobs near me". A pre-processor or other component of the computing device can detect the input query and invoke a digital assistant to perform an action based on the input query. The digital assistant can engage in a conversation with the user, perform a search, or perform another action responsive to the input query. However, this conversation or action may not take up the entire screen accessible to the computing device for output. The digital assistant can determine that there is wasted or unused screen space. Responsive to determining there is wasted or unused screen space, the digital assistant can generate content selection criteria. The content selection criteria can be based on the input query, the action to be performed based on the input query, or attributes associated with the computing device or available screen space. The digital assistant, upon generating the content selection criteria, can transmit a request for content based on the content selection criteria. The digital assistant can transmit the request for supplementary content to a content selector component configured to perform a real-time content selection process. Responsive to the request, the digital assistant can receive the selected supplementary content item. The digital assistant can provide the supplementary content item for provision or presentation in a graphical user interface slot located or positioned in a portion of the screen that is not used by the digital assistant to converse with the user of the computing device.

The digital assistant can automatically create the GUI slot for the supplementary content item. The digital assistant can configure the GUI slot for the supplementary content item. The digital assistant can establish dimensions for the slot. The digital assistant can restrict the types of supplementary content items that can be provided via the slot. For example, the digital assistant can restrict the type of supplementary content items to assistant-type content items. Assistant-type content can refer to content items that are compatible with an assistant generated slot. The digital assistant can control the format of the supplementary content items provided via the slot. Formats can include, for example, application install content, image content, video content, or audio content. The digital assistant can establish actions for the slot, such as the ability to pin the supplementary content item to the home screen, mute the slot, adjust parameters of the slot, or otherwise interact with the slot. The digital assistant can configure the slot based on quality signals or content parameters. Content parameters can include a brightness level, file size, number of frames, resolution, or audio output level. In some cases, the digital assistant can utilize a machine learning model or engine to generate the content selection criteria based on the input query and the one or more attributes or configurations of the slot.

Thus, this technical solution can reduce wasted screen space without using excessing computing resources by having a digital assistant automatically establish and configure a GUI slot for supplemental content items that satisfy a content parameters. The content parameters can be configured to reduce computing and energy resource consumption by, for example, restricting the brightness level or file size of the supplementary content item. While the selection of the supplementary content item can occur in parallel by a separate system or cloud-based computing infrastructure, a server digital assistant can control the delivery of the supplementary content item based on the delivery of an action data structure responsive to the voice input. For example, the server digital assistant can combine or package the supplementary content item with the action data structure in order to reduce data transmissions over a network. The server digital assistant can add a buffer to the delivery such that the action data structure that is responsive to the voice input is presented before the supplementary content item, thereby avoiding the introduction of delay or latency in presenting the action data structure. Further, by automatically generating the request for supplementary content, the digital assistant can proactively enhance or improve the action data structure without a separate request downstream.

FIG. 1 illustrates an example system 100 to control delivery of supplemental content via digital assistants. The system 100 can include content selection infrastructure. The system 100 can include a data processing system 102. The data processing system 102 can communicate with one or more of a computing device 140, service provider device 154, or a supplementary digital content provider device 152 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be provided, output, rendered, or displayed on at least one local computing device 140, such as a laptop, desktop, tablet, digital assistant device, smart phone, mobile telecommunication device, portable computers, or speaker. For example, via the network 105 a user of the local computing device 140 can access information or data provided by a supplementary digital content provider device 152. The computing device 140 may or may not include a display; for example, the computing device may include limited types of user interfaces, such as a microphone and speaker. In some cases, the primary user interface of the computing device 140 may be a microphone and speaker, or voice interface. In some cases, the computing device 140 includes a display device 150 coupled to the computing device 140, and the primary user interface of the computing device 140 can leverage the display device 150.

The local computing device 140 can refer to a computing device 140 that is being used by a user or in the possession of a user. The local computing device 140 can refer to a computing device or client device that is located at a public setting, such as a hotel, office, restaurant, retail store, mall, park, or a private setting, such as a residential dwelling. The term local can refer to the computing device being located where a user can interact with the computing device using voice input or other input. The local computing device can be located remote from a remote server, such as a data processing system 102. Thus, the local computing device 140 can be positioned in a hotel room, mall, cubicle, or other building or abode at which a user can interact with the local computing device 140 using voice input, whereas the data processing system 102 can be located remotely in a data center, for example. The local computing device 140 can be referred to as a digital assistant device.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be provided, output, rendered, or displayed by the local client computing device 140. For example, via the network 105 a user of the local client computing device 140 can access information or data provided by the supplementary digital content provider device 152 or the service provider computing device 154.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 140, the supplementary digital content provider device 152 (or third-party content provider device, content provider device), or the service provider device 154 (or third-party service provider device). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device, such as a service provider device 154 or supplementary digital content provider device 152. The service provider device 154 can include at least one logic device such as a computing device having a processor to communicate via the network 105, for example with the computing device 140, the data processing system 102, or the supplementary digital content provider device 152. The service provider device 154 can include at least one computation resource, server, processor or memory. For example, service provider device 154 can include a plurality of computation resources or servers located in at least one data center.

The supplementary digital content provider device 152 can provide audio based digital components for display by the local computing device 140 as an audio output digital component. The digital component can be referred to as a sponsored digital component because it is provided by a third-party sponsor. The digital component can include an offer for a good or service, such as a voice based message that states: "Would you like me to order you a taxi?" For example, the supplementary digital content provider device 152 can include memory to store a series of audio digital components that can be provided in response to a voice based query. The supplementary digital content provider device 152 can also provide audio based digital components (or other digital components) to the data processing system 102 where they can be stored in the data repository 124. The data processing system 102 can select the audio digital components and provide (or instruct the supplementary digital content provider device 152 to provide) the audio digital components to the client computing device 140. The audio based digital components can be exclusively audio or can be combined with text, image, or video data.

The service provider device 154 can include, interface with, or otherwise communicate with the data processing system 102. The service provider device 154 can include, interface, or otherwise communicate with the local computing device 140. The service provider device 154 can include, interface, or otherwise communicate with the computing device 140, which can be a mobile computing device. The service provider device 154 can include, interface, or otherwise communicate with the supplementary digital content provider device 152. For example, the service provider device 154 can provide a digital component to the local computing device 140 for execution by the local computing device 140. The service provider device 154 can provide the digital component to the data processing system 102 for storage by the data processing system 102. The service provider device 154 can provide rules or parameters relating to the digital component to the data processing system 102 for storage in a content data 126 data structure.

The local computing device 140 can include, interface, or otherwise communicate with at least one sensor 144, transducer 146, audio driver 148, or local digital assistant 142. The local computing device 140 can include a display device 150, such as a light indicator, light emitting diode ("LED"), organic light emitting diode ("OLED"), or other visual indicator configured to provide a visual or optic output. The sensor 144 can include, for example, an ambient light sensor, proximity sensor, temperature sensor, accelerometer, gyroscope, motion detector, GPS sensor, location sensor, microphone, or touch sensor. The transducer 146 can include a speaker or a microphone. The audio driver 148 can provide a software interface to the hardware transducer 146. The audio driver can execute the audio file or other instructions provided by the data processing system 102 to control the transducer 146 to generate a corresponding acoustic wave or sound wave.

The local digital assistant 142 can include one or more processors (e.g., processor 510), logic array, or memory. The local digital assistant 142 can detect a keyword and perform an action based on the keyword. The local digital assistant 142 can filter out one or more terms or modify the terms prior to transmitting the terms to the data processing system 102 (e.g., server digital assistant component 104) for further processing. The local digital assistant 142 can convert the analog audio signals detected by the microphone into a digital audio signal, and transmit one or more data packets carrying the digital audio signal to the data processing system 102 via the network 105. In some cases, the local digital assistant 142 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local digital assistant 142 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using a digital signal processing technique. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. In some cases, the local digital assistant 142 on the computing device 140 can apply the bandpass filter prior to transmitting the input audio signal to the data processing system 102, thereby reducing network bandwidth utilization. However, based on the computing resources available to the computing device 140 and the available network bandwidth, it may be more efficient to provide the input audio signal to the data processing system 102 to allow the data processing system 102 to perform the filtering.

The local digital assistant 142 can apply additional pre-processing or pre-filtering techniques such as noise reduction techniques to reduce ambient noise levels that can interfere with natural language processor. Noise reduction techniques can improve accuracy and speed of natural language processor, thereby improving the performance of the data processing system 102 and manage rendering of a graphical user interface provided via display device 150. The local digital assistant 142 can filter the input audio signal to create a filtered input audio signal, convert the filtered input audio signal to data packets, and transmit the data packets to a data processing system comprising one or more processors and memory.

The local digital assistant 142 can determine to invoke or launch an application on the computing device 140. The local digital assistant 142 can receive an instruction or command from the server digital assistant component 104 to invoke or launch an application on the computing device 140. The local digital assistant 142 can receive a deep-link or other information to facilitate launching of the application on the computing device 140, or otherwise executing the application on the computing device 140.

The local client computing device 140 can be associated with an end user that enters voice queries as audio input into the local client computing device 140 (via the sensor 144) and receives audio output in the form of a computer generated voice that can be provided from the data processing system 102 (or the supplementary digital content provider device 152 or the service provider computing device 154) to the local client computing device 140, output from the transducer 146 (e.g., a speaker). The computer generated voice can include recordings from a real person or computer generated language.

The data repository 124 can include one or more local or distributed databases, and can include a database management system. The data repository 124 can include computer data storage or memory and can store one or more of content data 126, attributes 128, content parameters 130, templates 156, or account information 158. Content data 126 can include or refer to information related to supplementary content items or sponsored content items. Content data can include content items, digital component objects, content selection criteria, content type, identifier of the provider of the content, keywords, or other information associated with content items that can be used by the content selector component 120 to perform a real-time content selection process.

Attributes 128 can include or refer to a quality, feature or characteristic associated with a GUI slot. Example attributes can include dimensions of the GUI slot, position of the GUI slot. Attributes 128 of a GUI slot can define aspects of sponsored content item provided via the GUI slot, such as a level of brightness, file size of the sponsored content item, duration of the sponsored content item (e.g., video or audio duration).

Content parameters 130 can refer to quality signals of criteria for a type of sponsored or supplementary content item. Types of supplementary content item can include digital assistant, search, contextual, video, or streamlining. Different types of sponsored content item can include different content parameters configured to improve presentation of the content item in a type of slot or on a type of computing device. Content parameters can include, for example, level of brightness, file size, processor utilization, duration, or other quality signals. For example, content parameters for a digital assistant content item can include a first brightness threshold that is lower than a second brightness threshold set for a contextual content item.

Templates 156 can include fields in a structured data set that can be populated by the direct action API 110 to further the operation that is requested via input audio. Template 156 data structure can include different types of templates for different actions. Account information 158 can include information associated with an electronic account. Electronic accounts can be associated with a computing device 140, or user thereof. Account information 158 can include, for example, an identifier, historical network activity, preferences, profile information, or other information that can facilitate generating an action data structure or selecting a supplementary content item.

The data processing system 102 can include a content placement system having at least one computation resource or server. The data processing system 102 can include, interface, or otherwise communicate with at least one interface 106. The data processing system 102 can include, interface, or otherwise communicate with at least one natural language processor component 108. The data processing system 102 can include, interface, or otherwise communicate with at least one direct action application programming interface ("API") 110. The data processing system 102 can include, interface or otherwise communicate with at least one query generator component 112. The data processing system 102 can include, interface or otherwise communicate with at least one slot injector component 114. The data processing system 102 can include, interface or otherwise communicate with at least one transmission controller component 116. The interface 106, natural language process component 108, direct action API 110, query generator component 112, slot injector component 114, or transmission controller component 116 can form a server digital assistant component 104. The data processing system 102 can include, interface, or otherwise communicate with at least one server digital assistant component 104. The server digital assistant component 104 can communicate or interface with one or more voice-based interfaces or various digital assistant devices or surfaces in order to provide data or receive data or perform other functionality.

The data processing system 102 can include, interface, or otherwise communicate with at least one validation component 118. The data processing system 102 can include, interface, or otherwise communicate with at least one content selector component 120. The data processing system 102 can include, interface, or otherwise communicate with at least one data repository 124.

The server digital assistant component 104, interface 106, NLP component 108, direct action API 110, query generator component 112, slot injector component 114, transmission controller component 116, validation component 118 or content selector component 120 can each include at least one processing unit or other logic device such as programmable logic array engine, or module configured to communicate with the database repository 124 or database. The server digital assistant component 104, interface 106, NLP component 108, direct action API 110, query generator component 112, slot injector component 114, transmission controller component 116, validation component 118, content selector component 120 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of local computing devices 140 (or computing device or digital assistant device). A user of a local computing device 140 or mobile computing device can affirmatively authorize the data processing system 102 to obtain network activity information corresponding to the local computing device 140 or mobile computing device. For example, the data processing system 102 can prompt the user of the computing device 140 for consent to obtain one or more types of network activity information. The local computing device 140 can include a mobile computing device, such as a smartphone, tablet, smartwatch, or wearable device. The identity of the user of the local computing device 140 can remain anonymous and the computing device 140 can be associated with a unique identifier (e.g., a unique identifier for the user or the computing device provided by the data processing system or a user of the computing device). The data processing system can associate each observation with a corresponding unique identifier.

The data processing system 102 can include an interface 106 (or interface component) designed, configured, constructed, or operational to receive and transmit information using, for example, data packets. The interface 106 can receive and transmit information using one or more protocols, such as a network protocol. The interface 106 can include a hardware interface, software interface, wired interface, or wireless interface. The interface 106 can facilitate translating or formatting data from one format to another format. For example, the interface 106 can include an application programming interface that includes definitions for communicating between various components, such as software components. The interface 106 can communicate with one or more of the local computing device 140, supplementary digital content provider device 152, or service provider device 154 via network 105.

The data processing system 102 can interface with an application, script or program installed at the local client computing device 140, such as an app to communicate input audio signals to the interface 106 of the data processing system 102 and to drive components of the local client computing device to render output audio signals. The data processing system 102 can receive data packets or other signal that includes or identifies an audio input signal.

The data processing system 102, or server digital assistant component 104, can include a natural language processor ("NLP") component 108. For example, the data processing system 102 can execute or run the NLP component 108 to receive or obtain the audio signal and parse the audio signal. For example, the NLP component 108 can provide for interactions between a human and a computer. The NLP component 108 can be configured with techniques for understanding natural language and allowing the data processing system 102 to derive meaning from human or natural language input. The NLP component 108 can include or be configured with technique based on machine learning, such as statistical machine learning. The NLP component 108 can utilize decision trees, statistical models, or probabilistic models to parse the input audio signal. The NLP component 108 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 108 can convert the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 108 matches the text to words that are associated, for example via training across users or through manual specification, with actions that the data processing system 102 can serve. Aspects or functionality of the NLP component 108 can be performed by the data processing system 102 or the local computing device 140. For example, a local NLP component can execute on the local computing device 140 to perform aspects of converting the input audio signal to text and transmitting the text via data packets to the data processing system 102 for further natural language processing.

The audio input signal can be detected by the sensor 144 or transducer 146 (e.g., a microphone) of the local client computing device 140. Via the transducer 146, the audio driver 148, or other components the local client computing device 140 can provide the audio input signal to the data processing system 102 (e.g., via the network 105) where it can be received (e.g., by the interface 106) and provided to the NLP component 108 or stored in the data repository 124.

The local computing device 140 can include an audio driver 148, a transducer 146, a sensor 144 and a local digital assistant 142. The sensor 144 can receive or detect an input audio signal (e.g., voice input). The local digital assistant 142 can be coupled to the audio driver, the transducer, and the sensor. The local digital assistant 142 can filter the input audio signal to create a filtered input audio signal (e.g., by removing certain frequencies or suppressing noise). The local digital assistant 142 can convert the filtered input audio signal to data packets (e.g., using a software or hardware digital-to-analog converter). In some cases, the local digital assistant 142 can convert the unfiltered input audio signal to data packets and transmit the data packets to the data processing system 102. The local digital assistant 142 can transmit the data packets to a data processing system 102 comprising one or more processors and memory that execute a natural language processor component, an interface, a speaker recognition component, and a direct action application programming interface.

The data processing system 102 can receive, via the interface, from the local digital assistant 142, the data packets comprising the filtered (or unfiltered) input audio signal detected by the sensor. The data processing system 102 can process the data packets to perform an action or otherwise respond to the voice input. In some cases, the data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The data processing system 102 can provide, to the local digital assistant 142 of the local computing device 140, a status. The local computing device 140 can receive the indication of the status. The audio driver can receive the indication of the status of the profile, and generate an output signal based on the indication. The audio driver can convert the indication to an output signal, such as sound signal, or acoustic output signal. The audio driver can drive the transducer 146 (e.g., speaker) to generate sound based on the output signal generated by the audio drive.

In some cases, the local computing device 140 can include a light source. The light source can include one or more LEDs, lights, display, or other component or device configured to provide an optical or visual output. The local digital assistant 142 can cause the light source to provide a visual indication corresponding to the status. For example, the visual indication can be a status indicator light that turns on, a change in color of the light, a light pattern with one or more colors, or a visual display of text or images.

The NLP component 108 can obtain the input audio signal. The NLP component 108 of the data processing system 102 can receive the data packets with the voice input or input audio signal responsive to the local digital assistant 142 detecting a trigger keyword. The trigger keyword can be a wakeup signal or hotword that indicates to the local computing device 140 to convert the subsequent audio input into text and transmit the text to data processing system 102 for further processing.

Upon receiving the input audio signal, the NLP component 108 can identify at least one request or at least one keyword corresponding to the request. The request can indicate intent or subject matter of the input audio signal. The keyword can indicate a type of action likely to be taken. For example, the NLP component 108 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In another example, the voice input can include a search query such as "find jobs near me."

The NLP component 108 can parse the input audio signal to identify, determine, retrieve, or otherwise obtain the request and one or more keywords associated with the request. For instance, the NLP component 108 can apply a semantic processing technique to the input audio signal to identify the keyword or the request. The NLP component 108 can apply the semantic processing technique to the input audio signal to identify a keyword or phrase that includes one or more keywords, such as a first keyword and a second keyword. For example, the input audio signal can include the sentence "I want to purchase an audiobook." The NLP component 108 can apply a semantic processing technique, or other natural language processing technique, to the data packets comprising the sentence to identify keywords or phrases "want to purchase" and "audiobook". The NLP component 108 can further identify multiple keywords, such as purchase, and audiobook. For example, the NLP component 108 can determine that the phrase includes a first and second keyword.

The NLP component 108 can filter the input audio signal to identify the trigger keyword. For example, the data packets carrying the input audio signal can include "It would be great if I could get someone that could help me go to the airport", in which case the NLP component 108 can filter out one or more terms as follows: "it", "would", "be", "great", "if", "I", "could", "get", "someone", "that", "could", or "help". By filtering out these terms, the NLP component 108 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I want to purchase an audiobook and monthly subscription to movies." The NLP component 108 can determine this is a request for an audio book and a streaming multimedia service. The NLP component 108 can determine this is a single request or multiple requests. The NLP component 108 can determine that this is two requests: a first request for a service provider that provides audiobooks, and a second request for a service provider that provides movie streaming. In some cases, the NLP component 108 can combine the multiple determined requests into a single request, and transmit the single request to a service provider device 154. In some cases, the NLP component 108 can transmit the individual requests to another service provider device, or separately transmit both requests to the same service provider device 154.

The data processing system 102 can include a direct action API 110 designed and constructed to generate, based on the one or more keywords in the voice input, an action data structure responsive to the request. Processors of the data processing system 102 can invoke the direct action API 110 to execute scripts that generate a data structure to provide to a service provider device 154 or other service provider to obtain a digital component, order a service or product, such as a car from a car share service or an audiobook. The direct action API 110 can obtain data from the data repository 124, as well as data received with end user consent from the local client computing device 140 to determine location, time, user accounts, logistical or other information to allow the service provider device 154 to perform an operation, such as reserve a car from the car share service. Using the direct action API 110, the data processing system 102 can also communicate with the service provider device 154 to complete the conversion by in this example making the car share pick up reservation.

The direct action API 110 can execute a specified action to satisfy the end user's intention, as determined by the data processing system 102. The action can include performing a search using a search engine, launching an application, ordering a good or service, providing requested information, or controlling a network connected devices (e.g., an internet-of-things device). Depending on the action specified in its inputs and the parameters or rules in the data repository 124, the direct action API 110 can execute code or a dialog script that identifies the parameters required to fulfill a user request. Such code can look-up additional information, e.g., in the data repository 124, such as the name of a home automation service, or third-party service, or it can provide audio output for rendering at the local client computing device 140 to ask the end user questions such as the intended destination of a requested taxi. The direct action API 110 can determine parameters and can package the information into an action data structure, which can then be sent to another component such as the content selector component 120 or to the service provider computing device 154 to be fulfilled.

The direct action API 110 can receive an instruction or command from the NLP component 108, or other component of the data processing system 102, to generate or construct the action data structure. The direct action API 110 can determine a type of action in order to select a template from the template repository 156 stored in the data repository 124. Types of actions can include, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 108 can parse the input audio signal to identify a request and a trigger keyword corresponding to the request, and provide the request and trigger keyword to the direct action API 110 to cause the direct action API to generate, based on the trigger keyword, a first action data structure responsive to the request. The direct action API 110, upon identifying the type of request, can access the corresponding template from the template repository 156. Templates can include fields in a structured data set that can be populated by the direct action API 110 to further the operation that is requested via input audio detected by the local computing device 140 of the service provider device 154 (such as the operation of sending a taxi to pick up an end user at a pickup location and transport the end user to a destination location). The direct action API 110 can perform a lookup in the template repository 156 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 110 can populate the fields with values. To populate the fields with values, the direct action API 110 can ping, poll or otherwise obtain information from one or more sensors 144 of the computing device 140 or a user interface of the device 140. For example, the direct action API 110 can detect the source location using a location sensor, such as a GPS sensor. The direct action API 110 can obtain further information by submitting a survey, prompt, or query to the end of user of the computing device 140. The direct action API can submit the survey, prompt, or query via interface 106 of the data processing system 102 and a user interface of the computing device 140 (e.g., audio interface, voice-based user interface, display, or touch screen). Thus, the direct action API 110 can select a template for the action data structure based on the trigger keyword or the request, populate one or more fields in the template with information detected by one or more sensors 144 or obtained via a user interface, and generate, create or otherwise construct the action data structure to facilitate performance of an operation by the service provider device 154.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 108 (e.g., the location of the local client computing device 140 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the local client computing device 140, prompting the end user of the local client computing device 140 for the information, or accessing an online web-based resource using an HTTP protocol. For example, the data processing system 102 can determine that it does not have the current location of the local client computing device 140, which may be a needed field of the template. The data processing system 102 can query the local client computing device 140 for the location information. The data processing system 102 can request the local client computing device 140 to provide the location information using one or more location sensors 144, such as a Global Positioning System sensor, WIFI triangulation, cell tower triangulation, Bluetooth beacons, IP address, or other location sensing technique.

In some cases, the data processing system 102 can generate the action data structure using the second profile. The data processing system 102 can then determine whether the action data structure generated using the second profile is compliant with the first profile. For example, the first profile can include a policy to block a type of action data structure, such as purchasing a product from an electronic online retailer via the local computing device 140. The input audio detected by the local computing device 140 may have included a request to purchase a product from the electronic online retailer. The data processing system 102 may have used the second profile to identify account information associated with the electronic online retailer, and then generated an action data structure to purchase the product. The action data structure can include the account identifier corresponding to the electronic account associated with the acoustic signature identified by the data processing system 102.

The data processing system 102 can identify an account associated with the user that provides the voice input. The data processing system can receive an audio input signal detected by the local computing device 140, identify an acoustic signature, and identify an electronic account corresponding to the acoustic signature. The data processing system 102 can identify, based on a lookup in the account data structure 158 in data repository 124, an electronic account corresponding to the acoustic signature. The data processing system 102 can access acoustic signatures stored in the data repository 124, such as in the accounts data structure 158. The data processing system 102 can be configured with one or more speaker recognition techniques, such as pattern recognition. The data processing system 102 can be configured with a text-independent speaker recognition process. In a text-independent speaker recognition process, the text used to establish the electronic account can be different from the text used to later recognize the speaker. Thus, the data processing system 102 can perform speaker recognition or voice recognition to identify an electronic account corresponding to the signature of the input audio signal.

For example, the data processing system 102 can identify acoustic features in the input audio signal that differ between input speech sources. The acoustic features can reflect physical or learned patterns that can correspond to a unique input speech source. Acoustic features can include, for example, voice pitch or speaking style. Techniques used to identify, process and store signatures can include frequency estimation (e.g., instantaneous fundamental frequency, or discrete energy separation algorithm), hidden Markov models (e.g., a stochastic model used to model randomly changing systems where the future stated depends on the current state, and in which the system being modeled has unobserved states), Gaussian mixture models (e.g., a parametric probability density function represented as a weighted sum of Gaussian component densities), pattern matching algorithms, neural networks, matrix representation, Vector Quantization (e.g., a quantization technique from signal processing that allows the modeling of probability density functions by the distribution of prototype vectors), or decision trees. Additional techniques can include anti-speaker techniques, such as cohort models, and world models. The data processing system 102 can be configured with a machine learning model to facilitate pattern recognition or adapt to speaker characteristics.

The data processing system 102 can include a query generator component 112 designed, constructed and operational to generate a query or content selection criteria based on the voice input. The query generator component 112 can be part of or interact with the server digital assistant component 104. For example, the server digital assistant component 104 can include the query generator component 112. The query generator component 112 can generate content selection criteria for input into a content selector component 120. The content selector component 120 can use the content selection criteria to select supplementary content provided by a third-party content provider (e.g., supplementary digital content provider device 152). The query generator component 112 can generate the content selection criteria with one or more keywords and a digital assistant content type.

The query generator component 112 can receive an indication from the NLP component 108 of the one or more keywords or request identified by the NLP component 108 in the input audio signal received from the computing device 140. The query generator component 112 can process the one or more keywords and request to determine whether or not to generate a request for supplementary content from a supplementary digital content provider device 152. Supplementary content can refer to or include sponsored content. For example, a supplementary digital content provider can bid on content items to be selected during a real-time content selection process for provision to a user via a computing device 140.

The query generator component 112 can generate the content selection criteria based on the one or more keywords identified in the voice input. The content selection criteria can include the keywords in the voice input. The query generator component 112 can further expand or broaden the keywords to select additional keywords.

The query generator component 112 can identify additional content selection criteria based on profile information stored in the account data structure 158. For example, the query generator component 112 can receive an indication of the account associated with the user or voice input, and retrieve account information, such as historic information associated with network activity (e.g., search history, click or selection performance). The query generator component 112 can generate keywords or other content selection criteria based on the historic information associated with network activity. For example, if search history included a search query for "jobs near me", then the query generator component 112 can generate keywords based on the term "jobs" and keywords based on a location of the computing device 140.

The query generator component 112 can access information associated with sensors 144 of the computing device 140 to generate the content selection criteria. The query generator component 112 can ping or poll one or more sensors 144 of the computing device 140 for information such as location information, motion information, or any other information that can facilitate generating content selection criteria.

The query generator component 112 can ping or poll the computing device 140 for information associated with the computing device 140, such as device configuration information. Device configuration information can include a type of device, available user interfaces of the device, remaining battery information, network connectivity information, display device 150 information (e.g., size of display or resolution of display), or make and model of the computing device 140. The query generator component 112 can use this device configuration to generate content selection criteria for input into the content selection component 120. By generating content selection criteria based on the device configuration information, the data processing system 102 can facilitate selecting supplementary or sponsored content items based on device configuration information associated with the computing device 140. The data processing system 102 can, therefore, select supplementary content item that is compatible with the device configuration information or otherwise optimized for the device configuration (e.g., reducing energy or computing resource utilization of the computing device 140).

The query generator component 112 can generate content selection criteria that indicates a type of sponsored or supplementary content to select for provision via the computing device 140. Types of sponsored content can include, for example: digital assistant, search, streaming video, streaming audio, or contextual content. Digital assistant content can refer to content that is configured for provision via graphical user interface slot generated by a local digital assistant 142 on a computing device 140. The digital assistant content can satisfy certain quality signals or content parameters that optimizes the digital assistant content for provision in a graphical user interface slot generated by the local digital assistant 142. These content parameters can include, for example, an image size, a brightness level, a file size, a network bandwidth utilization, a video duration, or an audio duration. Examples of digital assistant content can include assistant applications, chatbots, image content, video content, or audio content.

A search type of content can refer to sponsored content that is configured for provision alongside search results on a web browser. Search content can include text only content or text and image content. Search content can include a hyperlink to a landing web page.

A streaming video type of content can refer to video content that is configured to be played before a video begins, at the end of a video, or during a break in the video. Streaming video type content can include video and audio. A streaming audio type content item can refer to a content item that is played before, after, or during a break in streaming audio. Contextual content can refer to content items that are displayed alongside webpages published by content publishers, such as a news article, blog, or otherwise online document.

The query generator component 112 can generate the content selection criteria based on attributes associated with the graphical user interface ("GUI") slot in which the supplementary or sponsored content is to be provided. In some instances, the attributes for the content slot can be predetermined or preconfigured. The attributes for the content slot can be stored in an attributes data structure 128 in the data repository 124. Attributes can include, for example, dimensions of the slot, resolution of the display device 150, or other information. Attributes can be set based on a type of computing device 140. For example, a laptop computing device can have one or more different attributes than a smartphone computing device; or a smartphone computing device can have one or more different attributes from a desktop computing device.

The data processing system 102 can include a slot injector component 114 designed, constructed and operational to generate, create, or otherwise provide a graphical user interface slot on the display device 150 of the computing device 140. The local digital assistant 142 can provide the sponsored or supplementary content item in the GUI slot generated by the slot injector component 114. The server digital assistant component 104 can include the slot injector component 114, or otherwise interface or communicate with the slot injector component 114.

The slot injector component 114 can establish one or more attributes for the GUI slot on the computing device 140. The slot injector component 114 can establish attributes using various techniques. For example, the slot injector component 114 can obtain attributes from attribute data structure 128 that are preconfigured or assigned to a computing device 140. The attributes can be preconfigured or assigned based on a type of computing device 140. For example, the attributes data structure 128 can include a mapping of slot dimensions to a size of a display device 150. Thus, the slot injector component 114 can identify the size of the display device 150, and select the corresponding slot size. The slot injector component 114 can determine the size of the display device 150 based on receiving device configuration information from the computing device 140. The slot injector component 114 can determine the size to establish for the slot based on a make or model of the computing device 140. For example, the attribute data structure 128 can include a mapping of device makes and models to slot sizes.

The slot injector component 114 can determine attributes for the GUI slot that reduce energy consumption when a content item is provided via the GUI slot on the computing device 140. Attributes that can reduce energy consumption can include, for example, a level of brightness of the content item, file size for the content item, or duration of the content item (e.g., length of a video or audio content item). In some cases in which the content item is an application, such as an assistant application or a chatbot application, the attribute can include a level of processor utilization of the application.

The slot injector component 114 can determine the energy consumption related attributes based on a characteristic of the computing device 140. For example, if the computing device is being powered from a battery and not currently being charged, then the slot injector component 114 can select attributes for the slot that reduce battery utilization and energy consumption. If, however, the computing device 140 is connected to a power source, such as a power outlet, then the slot injector component 114 can select attributes that allow for the selection of a content item that can consume greater energy.

The data processing system 102 can receive an indication that the computing device receives power from a battery and is not connected to a charger. The data processing system 102 can generate, responsive to the indication, a graphical user interface slot (e.g., GUI slot 202 depicted in FIG. 2) with first attributes that reduce energy consumption relative to second attributes that consume a greater amount of energy. The second attributes can have a higher level of brightness, for example. The second attributes can be used to generate a GUI slot for the action data structure (e.g., second GUI slot 204 depicted in FIG. 2). The attributes for the digital assistant content type can reduce an amount of energy used to present the supplementary content via the computing device relative to attributes of a different type of supplementary content (e.g., search content, video streaming content, or contextual content) that causes the computing device to use a greater amount of energy. The attributes can relate to duration, file size, level of brightness, or other characteristics of digital content that impact computing resource, network, or energy consumption.

Thus, the data processing system 102 (e.g., via slot injector component 114) can generate the second graphical user interface slot. The slot injector component 114 can generate the GUI slot in a home screen of the computing device 140, such as a smartphone home screen. The home screen can refer to a main screen, start screen, or default GUI output by the computing device 140 via the display device 150. The home screen can display links to applications, settings and notifications. The data processing system 102 can generate the graphical user interface slot with attributes configured for the smartphone display.

The query generator component 112 can generate the content selection criteria based on the attributes of the slot established by the slot injector component 114. The query generator component 112 can include the attributes of the slot in the content selection criteria. The content selection criteria can include the attributes of the slot. The query generator component 112 can select the type of content based on the attributes of the slot. The attributes, as established by the slot injector component 114 for example, can indicate a type of content that is compatible with the slot. For example, if the slot injector component 114 was invoked by the server digital assistant component 104 to generate a GUI slot to provide supplementary content along with an action data structure generated responsive to voice input, then the content type can be a digital assistant type.

The server digital assistant component 104 can transmit a request for content to the content selector component 120. The server digital assistant component 104 can transmit a request for supplementary or sponsored content from a third-party content provider. The server digital assistant component 104 can transmit the content selection criteria generated by the query generator component 112 to the content selector component 120. The content selector component 120 can perform a content selection process to select a supplementary content item or sponsored content item. The content item can be a sponsored or supplementary digital component object. The content item can be provided by a third-party content provider, such as a supplementary digital content provider device 152. The supplementary content item can include an advertisement for goods or services. The content selector component 120 can use the content selection criteria to select a content item responsive to receiving a request for content from the server digital assistant component 104.

The server digital assistant component 104 can receive a supplementary or sponsored content item from the content selector component 120. The server digital assistant component 104 can receive the content item responsive to the request. The server digital assistant component 104 can provide the supplementary content item to the supplementary digital content provider device 152 for provision via the GUI slot generated by the slot injector component 114. However, and in some cases, the server digital assistant component 104 can receive the content item from the content selector component 120 before the direct action API 110 generates the action data structure responsive to the voice input audio signal received from the computing device 140. The direct action API 110 can take more time to generate the action data structure than the content selector component 120 takes to select the content item in the real-time content selection process using the content selection criteria. For example, the amount of computing done by the direct action API 110 to generate the action data structure can be greater than the amount of computing done by the content selector component 120 to select the content item. In another example, the computing infrastructure used by the content selector component 120 can be more powerful, robust, or scalable relative to the computing infrastructure used by the direct action API 110. In yet another example, the content selector component 120 can be more efficient at selecting a content item as compared to the direct action API 110 selecting an action data structure.

Thus, due to various technical challenges, the direct action API 110 can take longer to generate an action data structure than the content selector component 120 takes to select a content item. Further, due to the latencies in generating an action data structure, the data processing system 102 may transmit the content item to the computing device 140 for presentation prior to the action data structure. However, transmitting the content item prior to the action data structure can introduce further delays in presenting the action data structure because the computing device 140 may utilize computing resources to render and provide the content item, which can delay presentation of the action data structure. Presenting a sponsored or supplementary content item prior to the action data structure can provide a poor user experience or result in a poor user interface relative to providing the action data structure first or simultaneously with the content item. For example, to provide an improved user experience, the data processing system 102 can provide both the action data structure and the supplementary content item for simultaneously (e.g., within 0.01 seconds, 0.05 seconds, 0.1 seconds, 0.2 seconds, 0.3 seconds, 0.4 seconds, or 0.5 seconds). Another technical challenge includes sending multiple transmissions to the computing device 140, or performing multiple remote procedure calls. Sending an action data structure in one transmission and the content item in a second transmission can result in redundancies or inefficiencies in the network, as well as by the computing device 140 or local digital assistant 142 having to receive and process multiple transmissions.

Thus, this technical solution includes a transmission controller component 116 designed, constructed and operational to receive the action data structure and the content item and control the delivery or transmission in order to reduce network utilization, energy consumption, or processor utilization while improving a user interface of the computing device 140 and user experience. The server digital assistant component 104 can include, access, interface with or otherwise communicate with the transmission controller component 116. The transmission controller component 116 can be part of the server digital assistant component 104. To address one or more technical challenges due to transmitting the action data structure and the content item, the transmission controller component 116 can control transmission of the action data structure or the content item.

For example, the transmission controller component 116 can receive both the action data structure and the supplementary content item. The transmission controller component 116 can receive the action data structure from the direct action API 110. The transmission controller component 116 can receive the supplementary content item from the content selector component 120. The transmission controller component 116 can determine not to transmit the content item before the action data structure. The transmission controller component 116 can determine not to transmit the content item in a separate transmission from the action data structure. Instead, and for example, the transmission controller component 116 can determine to combine the action data structure with the content item to generate a combined data package. The transmission controller component 116 can transmit the combined data package as one set of data packets over one transmission to the computing device 140 via network 105. By generating a combined data package for transmission to the computing device 140, the transmission controller component 116 can improve a user interface or user experience by facilitating the computing device 140 to present the action data structure simultaneously with the content item. By generating the combined data package, the transmission controller component 116 can reduce the number of separate transmissions to the computing device 140 via network 105, thereby improving network transmission efficiency. Additionally, a single transmission as compared to multiple transmission can also improve network security. Thus, the transmission controller component 116 can be configured with a policy to wait to transmit the action data structure or content item until both are received, and then generate a combined data package for transmission to the computing device 140.

The combined data package can include a data packet with a header, and the payload can include both the action data structure and the content item. The combined data package can include instructions for how the computing device 140 is to provide the action data structure and the content item. For example, the combined data package can include instructions for the local digital assistant 142 that cause the local digital assistant 142 to provide the action data structure in a first GUI slot generated by the local digital assistant 142 for the action data structure, and provide the supplementary or sponsored content item in a second GUI slot generated by the local digital assistant 142 for the content item.

In some cases, the transmission controller 116 can transmit the action data structure and the content item in separate data transmissions, but add a delay or buffer in the transmission in order to reduce a delay between the transmission of the action data structure and the content item. For example, if the transmission controller component 116 receives the content item from the content selector component 120 before the transmission controller component 116 receives the action data structure from the direct action API 110, the transmission controller component 116 can add a delay or buffer to the content item transmission. The transmission controller component 116 can be preconfigured with a buffer or delay, such as 0.01 seconds, 0.02 seconds, 0.05 seconds, 0.1 seconds, or other time interval that facilitates reducing a delay or time difference between the transmission of the content item and the transmission of the action data structure. The transmission controller component 116 can automatically determine the buffer or delay based on historical performance of the content selector component 120 and the direct action API 110. For example, the transmission controller component 116 can determine that the content selector component 120 is, on average, 0.1 seconds faster at selecting the sponsored content item via a real-time content selection process relative to the direct action API 110 generating an action data structure responsive to the voice input. The transmission controller component 116 can add a 0.1 second buffer or delay into the transmission of the sponsored content item so as to reduce the time difference between transmissions of the action data structure and the content item.

In some cases, the transmission controller component 116 can wait to transmit the content item until the action data structure has been generated. The transmission controller component 116 can transmit the action data structure and the content item separately in separate transmissions, but re-order the transmissions such that the action data structure is transmitted before the content item.

The transmission controller component 116 can transmit the content item without waiting to receive the action data structure. The local digital assistant 142 can be configured to wait to render or provide the content item until the local digital assistant 142 receives the action data structure. The transmission controller component 116 can transmit an instruction along with the content item to instruct the local digital assistant 142 not to render the content item upon receipt, but to instead wait until the action data structure is generated and transmitted so that the local digital assistant 142 can render or provide the action data structure prior to or simultaneously with the content item.

Thus, and for example, the server digital assistant component 104 can transmit the request to the content selector component 120 to select the supplementary content in a manner that overlaps with the generation of the action data structure that is responsive to the voice input. The server digital assistant component 104 can transmit the request while the server digital assistant component 104 is still generating the action data structure. For example, the query generator component 112 can generate the content selection criteria and the request for content before the direct action API 110 has completed generating the action data structure. The query generator component 112 can proceed with transmitting the request for content along with the generated content selection criteria in a manner that overlaps with the direct action API 110 generating the action data structure. The query generator component 112 may proceed with transmitting the request for content without waiting for the direct action API 110 to generate the action data structure. The server digital assistant component 104 can receive, from the content selector component 120, the supplementary content item prior to generation of the action data structure by the direct action API 110. The transmission controller component 116 can determine to delay delivery or transmission to the computing device 140 of the supplementary content item until completion of generation of the action data structure. The transmission controller component 116 can provide, responsive to generation of the action data structure, the action data structure and the supplementary content item to the computing device for presentation.

If the query generator component 112 transmits the request to the content selector component 120 to select the supplementary content in a manner that overlaps with the generation of the action data structure, then the transmission controller component 116 can receive the selected supplementary content item from the content selector component 120 prior to the generation of the action data structure by the direct action API 110. The transmission controller component 116 can instruct the computing device 140 to provide the supplementary content item in the second graphical user interface slot responsive to presentation of the action data structure in the first graphical user interface slot. For example, the transmission controller component 116 can independently transmit the supplementary content item upon receipt from the content selector component 120, but include an instruction for the local digital assistant 142 to only present the supplementary content item in the second GUI slot responsive to, subsequent to, or simultaneously with the presentation of the action data structure in the first GUI slot.

The data processing system 102 can include a content selector component 120 designed, constructed, or operational to select supplementary content items (or sponsored content items or digital component objects). To select sponsored content item or digital components, the content selector component 120 can use the generated content selection criteria to select a matching sponsored content item based on a broad match, exact match, or phrase match. For example, the content selector component 120 can analyze, parse, or otherwise process subject matter of candidate sponsored content items to determine whether the subject matter of the candidate sponsored content items correspond to the subject matter of the keywords or phrases of the content selection criteria generated by the query generator component 112. The content selector component 120 can identify, analyze, or recognize voice, audio, terms, characters, text, symbols, or images of the candidate digital components using an image processing technique, character recognition technique, natural language processing technique, or database lookup. The candidate sponsored content items can include metadata indicative of the subject matter of the candidate digital components, in which case the content selector component 120 may process the metadata to determine whether the subject matter of the candidate digital component corresponds to the input audio signal. The content campaign provided by the supplementary digital content provider device 152 can include content selection criteria that the data processing system 102 can match to criteria indicated in the second profile layer or the first profile layer.

Content providers 152 may provide additional indicators when setting up a content campaign that includes digital components. The supplementary digital content provider device 152 may provide information at the content campaign or content group level that the content selector component 120 may identify by performing a lookup using information about the candidate digital component. For example, the candidate digital component may include a unique identifier, which may map to a content group, content campaign, or content provider. The content selector component 120 may determine, based on information stored in content data 126 in data repository 124, information about the supplementary digital content provider device 152.

Responsive to the request, content selector component 120 can select a digital component object from data repository 124 or a database associated with the supplementary digital content provider device 152. The supplementary digital content can be provided by a supplementary digital content provider device different from the service provider device 154. The supplementary digital content can correspond to a type of service different from a type of service of the action data structure (e.g., taxi service versus food delivery service). The computing device 140 can interact with the supplementary digital content. The computing device 140 can receive an audio response to the digital component. The computing device 140 can receive an indication to select a hyperlink or other button associated with the digital component object that causes or allows the computing device 140 to identify the supplementary digital content provider device 152 or service provider device 154, request a service from the supplementary digital content provider device 152 or service provider device 154, instruct the supplementary digital content provider device 152 or service provider device 154 to perform a service, transmit information to the supplementary digital content provider device 152 or service provider device 154, or otherwise query the supplementary digital content provider device 152 or service provider device 154.

A supplementary digital content provider device 152 can establish an electronic content campaign. The electronic content campaign can be stored as content data 126 in data repository 124. An electronic content campaign can refer to one or more content groups that correspond to a common theme. A content campaign can include a hierarchical data structure that includes content groups, digital component data objects, and content selection criteria provided by the content provider. The content selection criteria provided by the content provider device 152 can be compared with the content selection criteria generated by the query generator component 112 to identify a matching supplementary content item for transmission to the computing device 140. Content selection criteria provided by the content provider device 152 an include a type of content, such as a digital assistant content type, search content type, streaming video content type, streamlining audio content type, or a contextual content type. To create a content campaign, supplementary digital content provider device 152 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or supplementary digital content provider device 152), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device 150 of the client computing device 140, or audible via a speaker (e.g., transducer 146) of the computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The supplementary digital content provider device 152 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the supplementary digital content provider device 152 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The supplementary digital content provider device 152 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The supplementary digital content provider device 152 can provide one or more keywords to be used by the data processing system 102 to select a digital component object provided by the supplementary digital content provider device 152. The supplementary digital content provider device 152 can identify one or more keywords to bid on, and further provide bid amounts for various keywords. The supplementary digital content provider device 152 can provide additional content selection criteria to be used by the data processing system 102 to select digital component objects. Multiple supplementary digital content provider devices 152 can bid on the same or different keywords, and the data processing system 102 can run a content selection process or ad auction responsive to receiving an indication of a keyword of an electronic message.

The supplementary digital content provider device 152 can provide one or more digital component objects for selection by the data processing system 102. The data processing system 102 (e.g., via content selector component 120) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, digital component link, or an assistant application component. A digital component object (or digital component, supplementary content item, or sponsored content item) can include, for example, a content item, an online document, audio, images, video, multimedia content, sponsored content, or an assistant application. Upon selecting a digital component, the data processing system 102 (e.g., via the transmission controller component 116) can transmit the digital component object for rendering on a computing device 140 or display device 150 of the computing device 140. Rendering can include displaying the digital component on a display device, executing an application such as a chatbot or conversational bot, or playing the digital component via a speaker of the computing device 140. The data processing system 102 can provide instructions to a computing device 140 to render the digital component object. The data processing system 102 can instruct the computing device 140, or an audio driver 148 of the computing device 140, to generate audio signals or acoustic waves.

The data processing system 102, upon receiving supplementary content item from a supplementary digital content provider device 152, can pre-process or otherwise analyze the received content item to validate the content item for delivery and presentation. The data processing system 102 can analyze, evaluate, validate, or otherwise process the content item in order to identify errors, bugs, malicious code or characteristics, or quality issues. For example, to reduce wasted energy consumption, network bandwidth utilization, computing resource utilization, and latency, the data processing system 102 can include a validation component 118 designed, constructed and operational to validate supplementary content items prior to authorizing the supplementary content item for selection by the content selector component 120. Due to the additional technical challenges posed by presenting supplementary content items alongside action data structures generated by a server digital assistant component 104, the data processing system 102 can validate content item based on a content item type.

For example, the supplementary digital content provider device 152 can provide supplementary digital content items. The supplementary digital content items can be flagged, marked, or otherwise indicate a type. The type can be an assistant type content item. The data processing system 102 can access a content parameters data structure 130 stored in data repository 124 that includes content parameters or quality signals established for assistant type content. Content parameters can include, for example, level of brightness of the content item, file size of the content item, duration of the content item, processor utilization of the content item, or other quality signals. The content parameters can include thresholds for brightness, files size, duration, or processor utilizations. The validation component 118 can simulate rendering the received content item to measure a brightness level, processor utilization, file size, duration, or other content parameters. The validation component 118 can compare the simulated measurement with the threshold stored in content parameters 130 data structure to determine whether the content item satisfies the threshold. Satisfying the threshold can refer to or include the measured quality signal being less than or equal to the threshold.

For example, the validation component 118 can determine the perceived brightness of an image corresponding to a supplementary content item based on simulating the image or otherwise processing the image. The validation component 118 can compare the perceived brightness with a brightness threshold established for an assistant type content item. If the determined perceived brightness of the image is greater than the brightness threshold, then the validation component 118 can reject the supplementary content item. In some cases, the validation component 118 may not reject the supplementary content item, but can instead remove the flag or indication of the supplementary content item qualifying as an assistant type content item. The data processing system 102 can include the assistant type flag or remove the assistant type flag based on whether the content item satisfies the threshold.

Thus, the validation component 118 can facilitate optimizing performance of system 100 by weighting content items to increase or decrease the likelihood that the content items are selected by the content selector component 120. If the validation component 118 validates a content item based on the content parameters (e.g., the content item satisfies the content parameters thresholds), then the validation component 118 can indicate that the content item is a valid. A valid content item can refer to a content item being flagged as an assistant type and the validation component indicating that the content item satisfies the content parameters for an assistant type content item.

The content selector component 120 can select a content item based on the content selection criteria. If the content selection criteria generated by the query generator component 112 includes assistant type content, for example, then validate assistant content type can be weighted more heavily as compared to content items that are not assistant type. Thus, assistant type content items can have an increased likelihood of being selected by the content selector component 120 when the content selection criteria includes assistant type content. The digital assistant content type can define attributes for the content item (e.g., content parameters such as brightness levels).

For example, the content selector component 120 can, responsive to a request or receiving content selection criteria from the query generator component 112, can perform a real-time content selection process. Real-time content selection can refer to or include performing the content selection responsive to a request. Real-time can refer to or include selecting the content within 0.2 seconds, 0.3 seconds, 0.4 seconds, 0.5, 0.6 seconds, or 1 second of receiving the request. Real-time can refer to selecting the content responsive to receiving the input audio signal from the computing device 140.

The content selector component 120 can identify multiple candidate supplementary content items that correspond to the digital assistant content type. The content selector component 120 can use the content selection criteria to identify the candidate supplementary content items that match both the digital assistant content type as well as the one or more keywords generated by the query generator component 112 for the content selection criteria. The content selector component 120 can determine a score or rank for each of the multiple candidate supplementary content items in order to select a highest ranking supplementary content item to provide to the computing device 140. The content selector component 120 can select a supplementary content item that has been validated as a digital assistant type.

In some cases, the content selector component 120 can weight different content types differently. The content selector component 120 can apply a higher weight to content types that match the content type indicated in the content selection criteria generated by the query generator component 112. The query generator component 112 can generate content selection criteria that includes a desired content type or optimal content type. In some cases, the query generator component 112 can require the selected content item to match the desired content type, while in other cases the query generator component 112 can indicate to increase the likelihood that a content item having a matching content type is selected. For example, the content selector component 120 can identify, based on the one or more keywords, a first plurality of candidate supplementary content items that correspond to the digital assistant content type. The content selector component 120 can identify, based on the one or more keywords, a second plurality of candidate supplementary content items that have a second content type different from the digital assistant content type. The content selector component 120 can increase a weight of the first plurality of candidate supplementary content items to improve a likelihood of selection of one of the first plurality of candidate supplementary content items relative to selection of one of the second plurality of candidate supplementary content items. The content selector component 120 can then determine an overall score for each of the first and second plurality of content items, where the scores for the first plurality of content items are increased based on the weight. The content selector component 120 can select a highest ranking or highest scoring content item, which can be one of the first plurality of content items or one of the second plurality of content items. Thus, the content selector component 120 may select one of the second plurality of content items that has a content type different from a digital assistant type, even though digital assistant content is weighted more heavily.

The content selector component 120 can receive one or more supplementary content items from the third-party content provider (e.g., supplementary digital content provider device 152). The content selector component 120 can receive, for the one or more of the supplementary content items, an indication from the third-party content provider that indicates the one or more supplementary content items correspond to the digital assistant content type. The content selector component 120 can invoke the validation component 118 to identify content parameters for the digital assistant content type. The validation component 118 can perform, responsive to the indication of the digital assistant content type, a validation process on the one or more supplementary content items to identify one or more valid supplementary content items that satisfy the content parameters established for the digital assistant content type. The content selector component 120 can select the supplementary content item from the one or more valid supplementary content items.

Figure 2:
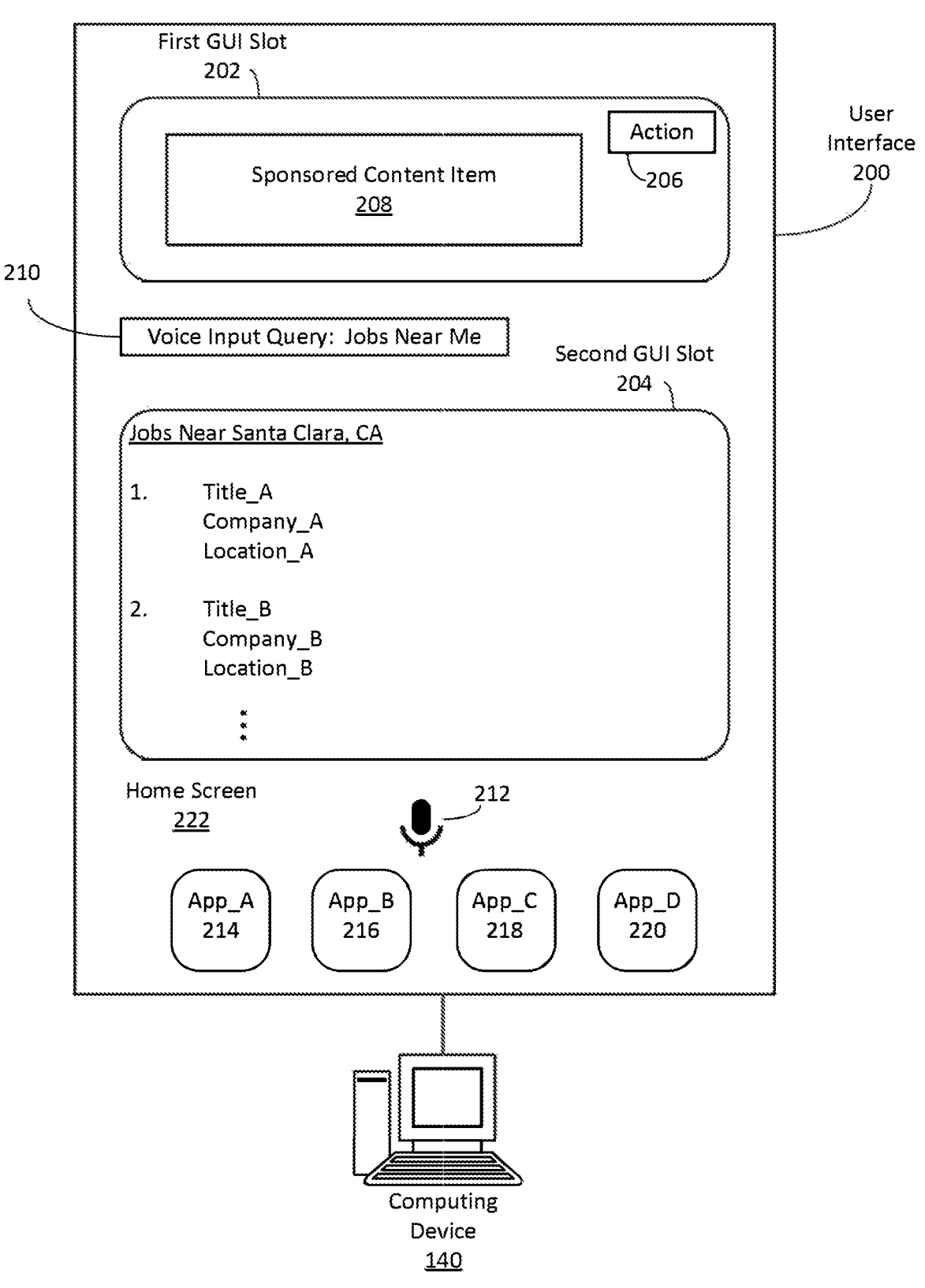
FIG. 2 is an illustration of an example user interface with a slot, in accordance with an implementation.

FIG. 2 is an illustration of an example user interface with a slot, in accordance with an implementation. The user interface 200 can be provided by computing device 140. The user interface 200 can provided via one or more system or component of system 100, including for example the data processing system, server digital assistant or local digital assistant. The user interface 200 can be output by a display device communicatively coupled to the computing device 140. The user interface 200 can include a home screen 222 (e.g., main screen, start screen, or default screen). The home screen 222 can include one or more applications, such as App_A 214, App_B 216, App_C 218, or App_D 220. The applications 214-220 can refer to a phone application, web browser, contacts, calculator, text messaging application, or other application.

A user can provide a voice input or input audio signal via the home screen 222. The user can invoke a digital assistant and provide a voice input. When the local digital assistant is invoked, the computing device 140 can provide an indication that the local digital assistant is active or invoked. The indication can include a microphone icon 212, for example. In some cases, selecting the microphone icon 212 can invoke the digital assistant.

The user can provide voice input such as a query. For example, the query can be "jobs near me". The local digital assistant can display a text box 210 with the voice input query "jobs near me". The local digital assistant can transmit the data packets, input audio signal, or the voice input query to the server digital assistant for further processing. The server digital assistant, upon receiving the input audio signal or voice input query, can generate an action data structure responsive to the voice input query. The action data structure can include search results, the jobs that near the computing device. The server digital assistant can provide the action data structure to the computing device with instructions to render or provide the action data structure in a second GUI slot 204. The data processing system can provide instructions to the local digital assistant to establish a second GUI slot 204 pursuant to one or more attributes associated with the computing device 140 or the action data structure.

The data processing system, upon receiving the voice input query, can generate content selection criteria and make a request for supplementary content. The data processing system can generate the content selection criteria based on the voice input query. The data processing system can select sponsored or supplementary content. The data processing system can transmit the sponsored content for provision via the user interface 200. For example, the data processing system can provide instructions to the local digital assistant to generate a first GUI slot 202 in which to provide the sponsored content item 208. The first GUI slot 202 can be constructed or injected on the home screen 222. The first GUI slot 202 can be separate or independent of the second GUI slot 204 in which the action data structure is provided.

The first GUI slot 202 can be established with one or more actions 206. Actions 206 can include, for example, pin, move, resize, hide, or minimize. Pin can refer to pinning the sponsored content item 208 or first GUI slot 202 to the home screen such that the sponsored content item 208 stays on the home screen 222 of the user interface 200. Move can refer to moving the first GUI slot 202 to another position or location on the home screen 222. For example, from a top of the home screen 222 to a middle or bottom of the home screen 222, or any other position on the home screen 222. Resizing can refer to changing the size of the first GUI slot 202. Resizing the first GUI slot 202 can cause the local digital assistant to resize the sponsored content item 208 being presented via the first GUI slot 202. Hiding can refer to removing the first GUI slot 202 or making the first GUI slot 202 no longer visible via the home screen 222.

The local digital assistant can remember the action 206 selected by the user, and update the attribute or configuration of the first GUI slot 202 based on the selected action. For example, moving or resizing the first GUI slot 202 can cause the first GUI slot 202 to be moved for subsequent sponsored content items 208 that are provided in the first GUI slot 202. Pinning, however, can refer to pinning a specific sponsored content item 208. For example, the sponsored content item 208 selected responsive to the "jobs near me" voice input query can include an advertisement for clothing retailer that sells business suits. The user, upon seeing the sponsored content item 208, can determine to pin this sponsored content item 208 to the home screen 222.

Figure 3:
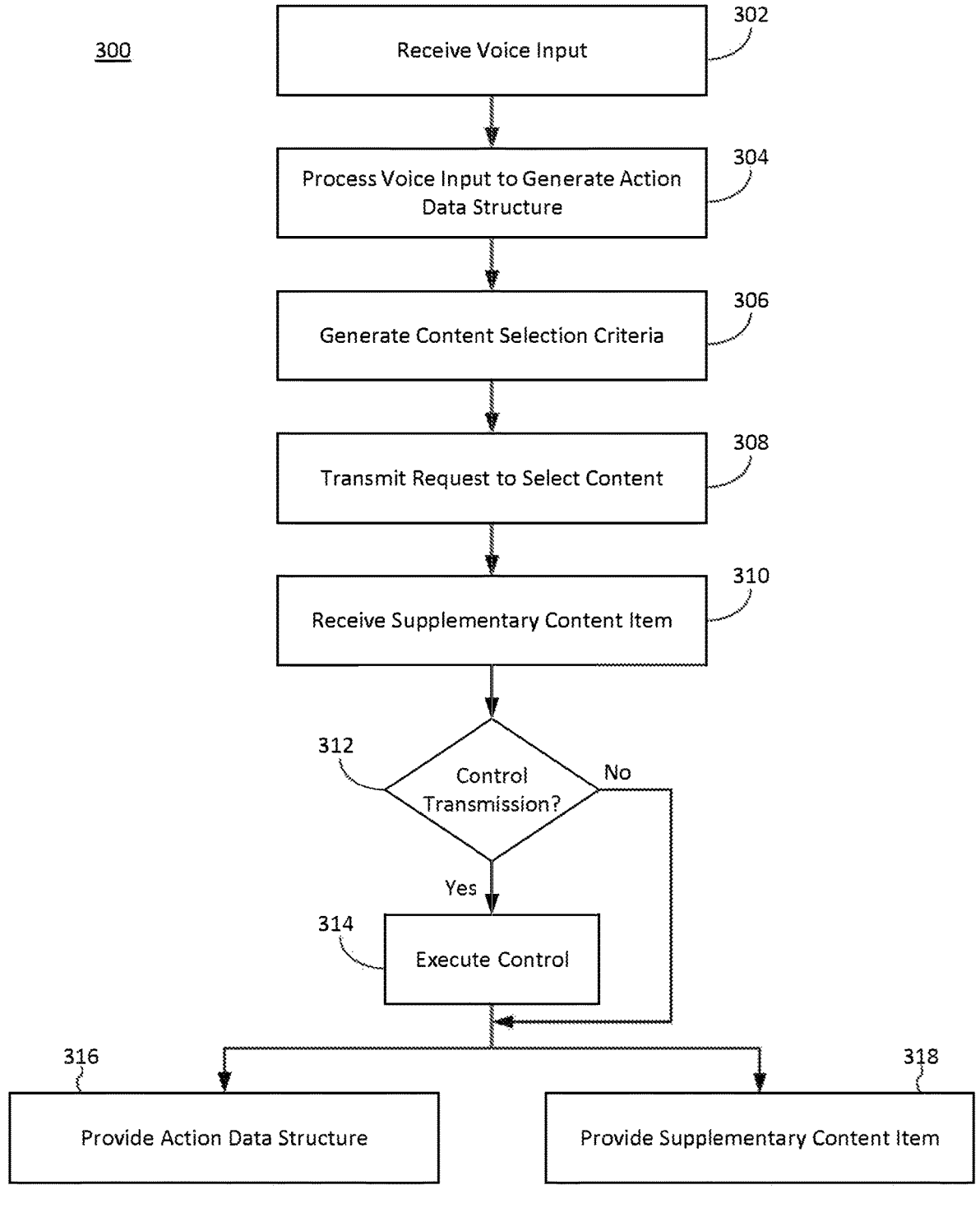
FIG. 3 is an illustration of an example method of controlling delivery of supplementary content via digital assistants, in accordance with an implementation.

FIG. 3 is an illustration of an example method of controlling delivery of supplementary content via digital assistants, in accordance with an implementation. The method

300 can be performed by one or more of a computing device, data processing system, local digital assistant, or server digital assistant, for example. At ACT 302, the method 300 can include receiving voice input. The data processing system can receive data packets comprising voice input or an input audio signal. The voice input can include a voice input query provided by a user or other speaker, and detected by a microphone of a computing device, such as a smartphone or tablet computing device, for example.

At ACT 304, the data processing system can process the voice input to generate an action data structure. The data processing system (e.g., a direct action API) can use natural language processing techniques to process or parse the voice input and generate an action data structure. The action data structure can be response to the voice input.

At ACT 306, the data processing system can generate content selection criteria. The data processing system can generate content selection criteria based on the voice input. The data processing system can generate content selection criteria based on a keyword in the voice input. The data processing system can generate content selection criteria based on a profile or account information associated with the computing device that detected the voice input. The data processing system can generate content selection criteria that includes one or more keywords. The content selection criteria can include or indicate a content type, such as a digital assistant content type.

The data processing system can generate a request for content and transmit the request for content, along with the content selection criteria, to a content selector component. The data processing system can include the content selector component. The data processing system can select a supplementary content item based on the content selection criteria. The data processing system can select the content item using a real-time content selection process. The data processing system can select the content item using an online auction. The sponsored or supplementary content item selected by the data processing system can be different from the action data structure generated by the content item. The action data structure can be generated responsive to the voice input. The supplementary content item can be selected using an online auction-based system in which third-party content providers can bid on the supplementary content items in order to win the auction.

At ACT 310, the data processing system can receive the selected supplementary content item. The data processing system can receive the supplementary content item from the content selector component. In some cases, the data processing system can receive the supplementary content item before the data processing system generates the action data structure. For example, the hardware or computing infrastructure that selects the supplementary content item can select the supplementary content item before the direct action API generates the action data structure.

The data processing system, at decision block 312, can determine whether to control the transmission. Controlling the transmission can refer to or include adding a buffer, combining the action data structure with the supplementary content item, or otherwise controlling how the action data structure and the content item are provided relative to one another. The data processing system can determine to control the transmission based on a policy or rule. For example, if the data processing system receives the supplementary content item before the action data structure has been generated, the data processing system can determine to control transmission. If the data processing system historically receives the content item before the action data structure by an amount of time greater than a threshold, then the data processing system can determine to control transmission. The data processing system can determine to control transmission to reduce energy consumption, network bandwidth utilization, or computing resource utilization. For example, if the computing device has limited battery resources or is on a network with limited bandwidth, then the data processing system can determine to control transmission in order to reduce network bandwidth utilization or battery energy utilization.

If the data processing system determines to control transmission, the data processing system can proceed to ACT 314 to execute a transmission control protocol. The data processing system can determine to buffer the content item or otherwise delay the transmission of the content item so that the action data structure is transmitted prior to the content item or simultaneously with the content item. For example, if the data processing system takes 0.4 seconds to generate the action data structure, but receives the supplementary content item within 0.1 seconds, then the data processing system can add a buffer or delay of 0.3 seconds to the content item transmission, resulting in the action data structure and supplementary content item being transmitted simultaneously to the computing device for presentation.

The data processing system can control transmission by providing an instruction to the computing device to present the content item after presenting the action data structure. The data processing system can provide an instruction to the computing device to present the content item at the same time as the action data structure. Thus, the data processing system can control presentation or rendering of the action data structure and supplementary content item relative to one another.

The data processing system can control transmission by combining the action data structure with the supplementary content item. The data processing system can generate a combined data package that includes the action data structure and the supplementary content item. The combined data package can include instructions to cause the computing device to render the action data structure in a different GUI slot than the supplementary content item.

If, however, the data processing system determines not to control the transmission, the data processing system can proceed to ACTS 316 and 318 to transmit the supplementary content item and the action data structure to the computing device for presentation. The data processing system can transmit the supplementary content item at ACT 318 and transmit the action data structure at ACT 316 pursuant to the transmission control policy, if selected.

Figure 4:
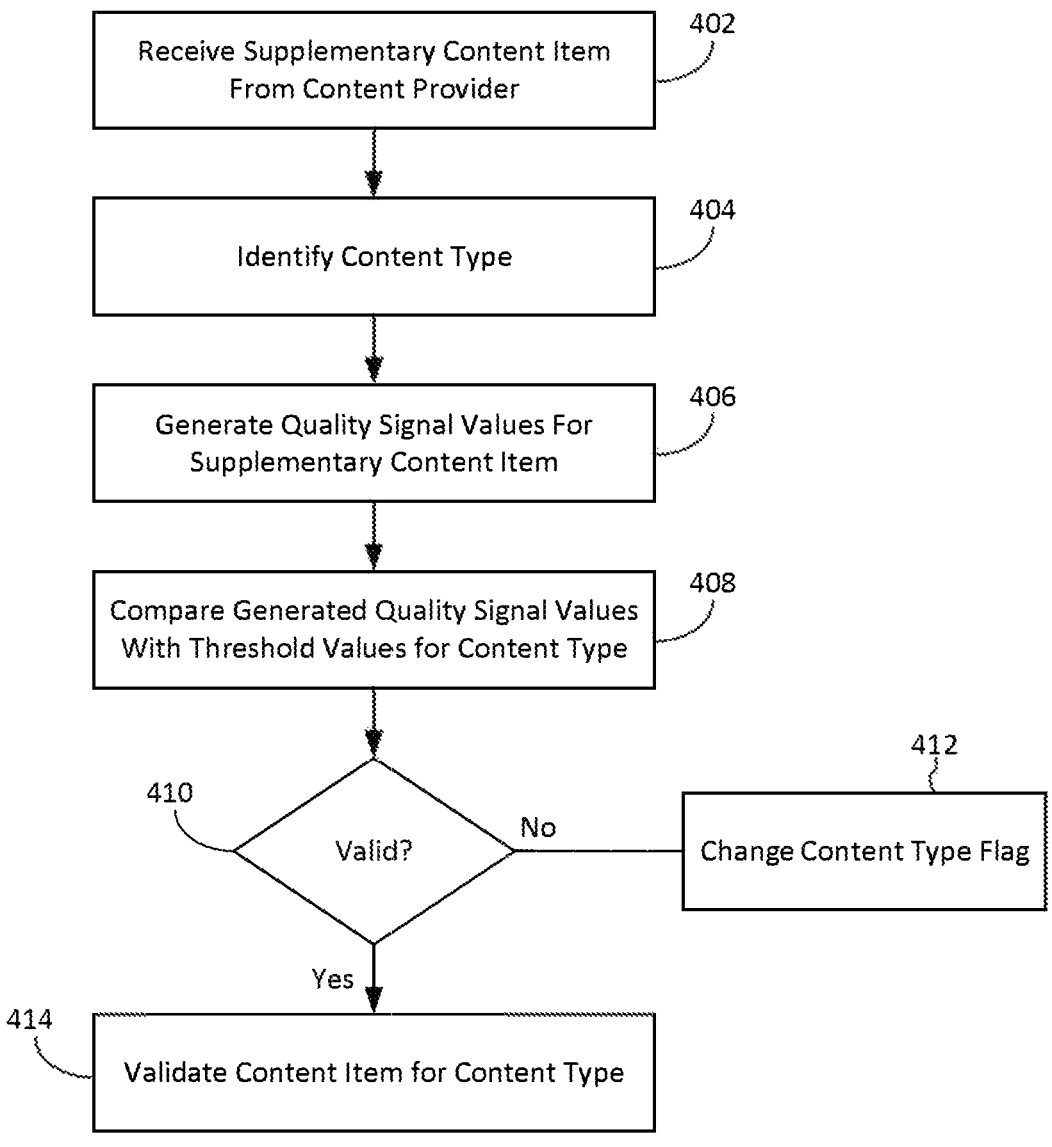
FIG. 4 is an illustration of an example method of validating supplementary content based on a content type, in accordance with an implementation.

FIG. 4 is an illustration of an example method of validating supplementary content based on a content type, in accordance with an implementation. The method 400 can be performed by one or more system or component depicted in FIG. 100, including, for example, a data processing system, content selector component, or validation component. At ACT 402, the method 400 can include receiving supplementary content item from a content provider. The content provider can be a third-party content provider that provides sponsored content. The data processing system can receive the supplementary content or the sponsored content as part of a content campaign. The data processing system can provide a user interface to allow the content provider to transfer the content items. The data processing system can provide a campaign setup user interface or graphical user interface in which the content provider can upload or other transfer electronic files containing supplementary or sponsored content items.

At ACT 404, the data processing system can identify a content type. The content provider can indicate a content type for each of the content items uploaded to the data processing system. The content type can indicate where the content item can be provided. For example, content types can include digital assistant, search, contextual, streaming video, or streaming audio. Different content types can be optimized or preferred for different digital mediums. For example, search content can include text only content. Contextual content can include text and images. Streaming audio content can include audio only. Streaming video content can include both audio and video content. Digital assistant content, for example, can include text, images, audio, video or assistant applications.

Different types of content can include different content parameters. Content parameters can refer to duration of the content, level of brightness of the content, file size of the content, or processor utilization of the content. For example, content parameters for digital assistant content configured for a home screen on a mobile device can include a lower level of brightness threshold as compared to contextual content to be provided on a desktop computing device, for example.

At ACT 406, the data processing system can generate a quality signal value for the supplementary content item. The data processing system can simulate provision or rendering of the supplementary content item to generate quality signals. The data processing system can evaluate the supplementary content item to determine values for quality signals. Quality signals can include a level of brightness, file size, duration, audio level, processor utilization, or other quality signal. The data processing system can determine the level of brightness, file size, duration, or processor utilization of the supplementary content item provided by the third-party content provider.

At ACT 408, the data processing system can compare the generated quality signal value with a threshold established for the content type indicated by the content provider. For example, if the content provider indicates that the supplementary content item is a digital assistant type, then the data processing system can retrieve a level of brightness threshold for the digital assistant content type, and compare the quality signal value for the level of brightness with the threshold. The data processing system can compare each quality signal value with a corresponding threshold for the content type.

At decision block 410, the data processing system can determine whether the supplementary content item is valid. Valid can refer to whether the quality signal values for the content item satisfy the thresholds for the content type. If the data processing system determines at decision block 410 that the content item is valid, the data processing system can proceed to ACT 414 to validate the content item for the content type. If, however, the data processing system determines at decision block 410 that the supplementary content item is not valid, the data processing system can proceed to ACT 412 to change a content type flag.

If the generated quality signal value is greater than the threshold, the data processing system can determine to reject the supplementary content item. The data processing system can remove the supplementary content item from the content data repository. In some cases, the data processing system can determine to change the content type flag; e.g., change the content type to search content as opposed to digital assistant content, if the remaining quality signal values satisfy the other content type.

Figure 5:
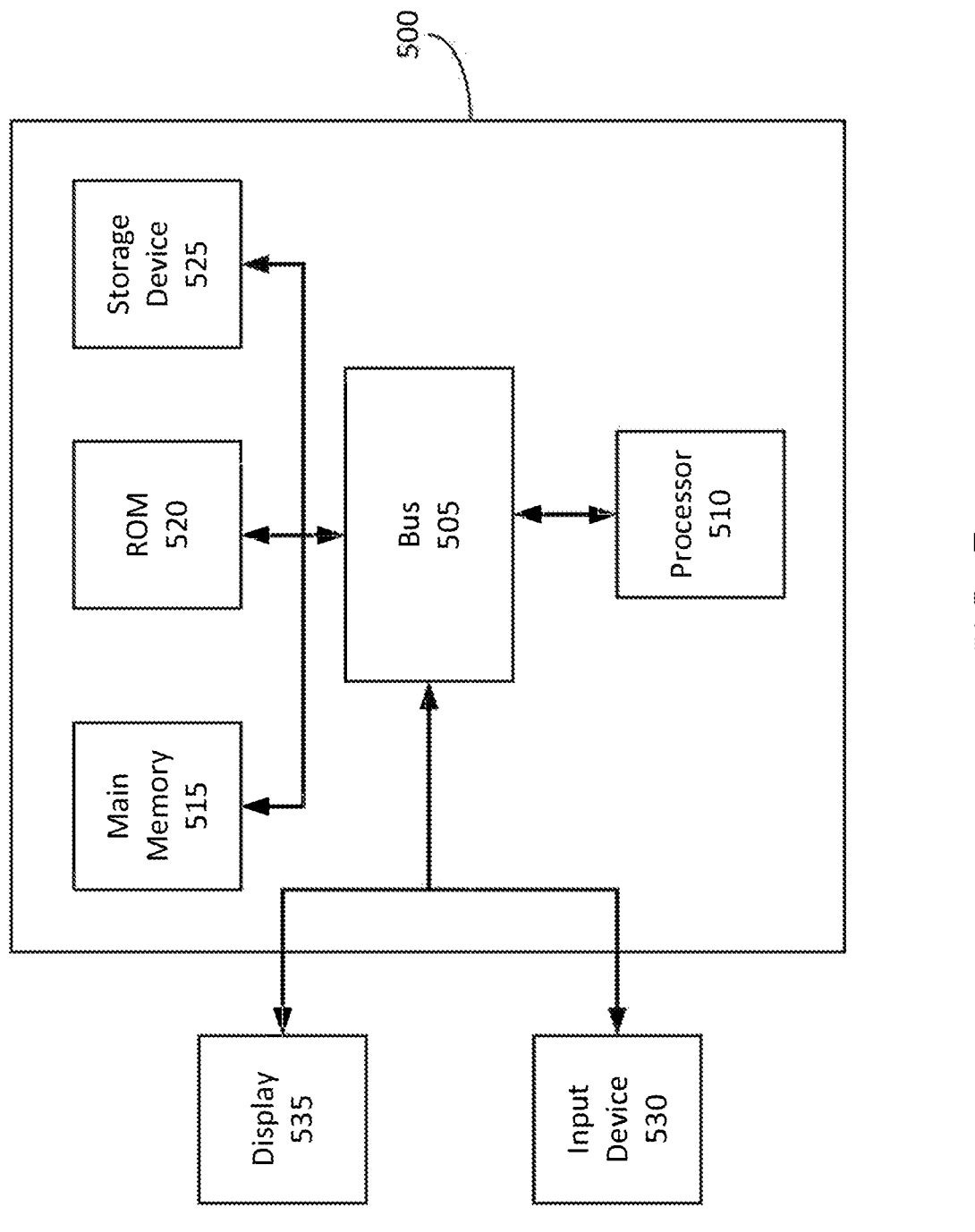
FIG. 5 is a block diagram illustrating a general architecture for a computer system that can be employed to implement elements of the systems and methods described and illustrated herein, including, for example, the system depicted in FIG. 1, the user interface depicted in FIG. 2, and the methods depicted in FIGS. 3 and 4.

FIG. 5 is a block diagram of an example computer system 500. The computer system or computing device 500 can include or be used to implement the system 100, or its components such as the data processing system 102. The data processing system 102 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 124. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 124.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 140 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 110, content selector component 120, or NLP component 108 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the local computing device 140 or the supplementary digital content provider device 152 or the service provider device 154).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 108 or the direct action API 110, can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to control delivery of supplementary content via digital assistants, comprising:

a data processing system comprising memory and one or more processors;

a digital assistant component of the data processing system to:

receive, via a network, data packets from a computing device comprising voice input detected by a microphone of the computing device;

process the data packets to generate an action data structure that is responsive to the voice input;

generate content selection criteria for input into a content selector component to select supplementary content provided by a third-party content provider, the content selection criteria comprising one or more keywords and a digital assistant content type;

transmit a request to the content selector component to select supplementary content based on the content selection criteria, in a manner that overlaps with the generation of the action data structure that is responsive to the voice input;

receive, responsive to the request and prior to generation of the action data structure, a supplementary content item selected by the content selector component based on the content selection criteria generated by the digital assistant component;

in response to receiving the supplementary content item prior to the generation of the action data structure, determine to delay delivery of the supplementary content item until completion of generation of the action data structure, wherein transmission of the supplementary content item is delayed so that the action data structure is transmitted prior to the supplementary content item, wherein transmission of the supplementary content item is delayed by adding a buffer in the transmission of the supplementary content item;

provide, responsive to generation of the action data structure, in a first graphical user interface slot via a display device coupled to the computing device, the action data structure responsive to the voice input; and provide, responsive to generation of the action data structure, in a second graphical user interface slot via the display device coupled to the computing device, the supplementary content item selected by the content selector component.

2. The system of claim 1, comprising:

the data processing system to generate the second graphical user interface slot in a home screen of the computing device.

3. The system of claim 1, comprising:

the data processing system to generate the second graphical user interface slot with attributes configured for a mobile display device.

4. The system of claim 1, comprising the data processing system to:

receive an indication that the computing device receives power from a battery and is not connected to a charger; and generate, responsive to the indication, the second graphical user interface slot with first attributes that reduce energy consumption relative to second attributes that consume a greater amount of energy.

5. The system of claim 1, comprising the data processing system to:

generate the content selection criteria comprising the digital assistant content type, wherein the digital assistant content type defines attributes for the supplementary content.

6. The system of claim 5, wherein the attributes for the digital assistant content type reduce an amount of energy used to provide the supplementary content via the computing device relative to second attributes of a different type of supplementary content that causes the computing device to use a greater amount of energy.

7. The system of claim 1, comprising the data processing system to:

transmit the request to the content selector component to select the supplementary content in a manner that overlaps with the generation of the action data structure that is responsive to the voice input;

receive, from the content selector component, the supplementary content item prior to generation of the action data structure; and instruct the computing device to provide the supplementary content item in the second graphical user interface slot responsive to provision of the action data structure in the first graphical user interface slot.

8. The system of claim 1, wherein the second graphical user interface slot is configured to pin the supplementary content item on a home screen of the computing device.

9. The system of claim 1, wherein the supplementary content item comprises a supplementary digital assistant application provided by the third-party content provider.

10. The system of claim 1, comprising the content selector component to:

identify a plurality of candidate supplementary content items that correspond to the digital assistant content type; and select the supplementary content item from the plurality of candidate supplementary content items based on the one or more keywords.

11. The system of claim 1, comprising the content selector component to:

identify, based on the one or more keywords, a first plurality of candidate supplementary content items that correspond to the digital assistant content type;

identify, based on the one or more keywords, a second plurality of candidate supplementary content items that have a second content type different from the digital assistant content type; and increase a weight of the first plurality of candidate supplementary content items to improve a likelihood of selection of one of the first plurality of candidate supplementary content items relative to selection of one of the second plurality of candidate supplementary content items.

12. The system of claim 1, comprising the content selector component to:

receive one or more supplementary content items from the third-party content provider;

receive, for the one or more of the supplementary content items, an indication from the third-party content provider that indicates the one or more supplementary content items correspond to the digital assistant content type;

identify content parameters for the digital assistant content type; and perform, responsive to the indication of the digital assistant content type, a validation process on the one or more supplementary content items to identify one or more valid supplementary content items that satisfy the content parameters established for the digital assistant content type.

13. The system of claim 12, comprising:

the content selector component to select the supplementary content item from the one or more valid supplementary content items.

14. The system of claim 12, wherein the content parameters comprise at least one of an image size, a brightness level, a file size, a network bandwidth utilization, a video duration, or an audio duration.

15. A method of delivering supplementary content via digital assistants, comprising:

a data processing system comprising memory and one or more processors;

a digital assistant component of the data processing system to:

receiving, by a data processing system comprising memory and one or more processors, via a network, data packets from a computing device comprising voice input detected by a microphone of the computing device;

processing, by a digital assistant component of the data processing system, the data packets to generate an action data structure that is responsive to the voice input;

generating, by the digital assistant component, content selection criteria for input into a content selector component to select supplementary content provided by a third-party content provider, the content selection criteria comprising one or more keywords and a digital assistant content type;

transmitting, by the digital assistant component, a request to the content selector component to select supplementary content based on the content selection criteria, in a manner that overlaps with the generation of the action data structure that is responsive to the voice input;

receiving, by the digital assistant component and prior to generation of the action data structure, responsive to the request, a supplementary content item selected by the content selector component based on the content selection criteria generated by the digital assistant component;

in response to receiving the supplementary content item prior to the generation of the action data structure, determining to delay delivery of the supplementary content item until completion of generation of the action data structure, wherein transmission of the supplementary content item is delayed so that the action data structure is transmitted prior to the supplementary content item, wherein transmission of the supplementary content item is delayed by adding a buffer in the transmission of the supplementary content item;

providing, by the digital assistant component and responsive to generation of the action data structure, in a first graphical user interface slot via a display device coupled to the computing device, the action data structure responsive to the voice input; and providing, by the digital assistant component and responsive to generation of the action data structure, in a second graphical user interface slot via the display device coupled to the computing device, the supplementary content item selected by the content selector component.

16. The method of claim 15, comprising:

generating, by the data processing system, the second graphical user interface slot in a home screen of the computing device with attributes configured for a mobile display device.

17. The method of claim 15, comprising:

generating, by the data processing system, the content selection criteria comprising the digital assistant content type, wherein the digital assistant content type defines attributes for the supplementary content and that reduce an amount of energy used to provide the supplementary content via the computing device relative to second attributes of a different type of supplementary content that causes the computing device to use a greater amount of energy.

18. The method of claim 15, comprising:

transmitting, by the data processing system, the request to the content selector component to select the supplementary content in a manner that overlaps with the generation of the action data structure that is responsive to the voice input;

receiving, by the data processing system from the content selector component, the supplementary content item prior to generation of the action data structure; and instructing, by the data processing system, the computing device to provide the supplementary content item in the second graphical user interface slot responsive to provision of the action data structure in the first graphical user interface slot.

19. The method of claim 15, comprising:

receiving, by the content selector component, one or more supplementary content items from the third-party content provider;

receiving, by the content selector component, for the one or more of the supplementary content items, an indication from the third-party content provider that indicates the one or more supplementary content items correspond to the digital assistant content type;

identifying, by the content selector component, content parameters for the digital assistant content type, wherein the content parameters comprise at least one of an image size, a brightness level, a file size, a network bandwidth utilization, a video duration, or an audio duration; and performing, by the content selector component, responsive to the indication of the digital assistant content type, a validation process on the one or more supplementary content items to identify one or more valid supplementary content items that satisfy the content parameters established for the digital assistant content type.

20. The system of claim 1, wherein the buffer is determined based on historical performance of the content selector component and an application programming interface (API).

21. The system of claim 1, wherein the buffer is preconfigured.

22. The system of claim 1, wherein the buffer is based on average time difference between receiving the supplementary content item and generating the action data structure.

* * * * *